United States Patent
Aklian et al.

(10) Patent No.: US 8,541,059 B2
(45) Date of Patent: Sep. 24, 2013

(54) POLYURETHANE COATINGS WITH IMPROVED INTERLAYER ADHESION

(75) Inventors: Jak Aklian, North Hollywood, CA (US); Guangliang Tang, Glendale, CA (US); Siamanto Abrami, Glendale, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 474 days.

(21) Appl. No.: 11/852,531

(22) Filed: Sep. 10, 2007

(65) Prior Publication Data
US 2009/0068366 A1     Mar. 12, 2009

(51) Int. Cl.
*B05D 3/02*     (2006.01)

(52) U.S. Cl.
USPC ..... 427/385.5; 427/140; 427/384; 427/412.1; 106/287.23; 106/287.3; 428/63

(58) Field of Classification Search
USPC ................. 427/140, 412.1, 384; 106/287.23; 106/287.3; 428/63
See application file for complete search history.

(56) References Cited

U.S. PATENT DOCUMENTS

| | | | | |
|---|---|---|---|---|
| 4,343,839 | A * | 8/1982 | Blegen | 427/340 |
| 5,502,148 | A * | 3/1996 | Hentschel et al. | 528/60 |
| 5,563,207 | A * | 10/1996 | Brahm et al. | 524/591 |
| 6,136,455 | A * | 10/2000 | Anyashiki et al. | 428/659 |
| 6,294,607 | B1 * | 9/2001 | Guo et al. | 524/507 |
| 6,482,474 | B1 | 11/2002 | Fenn | |
| 6,992,133 | B2 * | 1/2006 | Yokoyama et al. | 524/601 |
| 2006/0004139 | A1 | 1/2006 | Connelly | |
| 2006/0106157 | A1 * | 5/2006 | Sawant et al. | 524/589 |
| 2006/0276599 | A1 | 12/2006 | DeWitt | |

FOREIGN PATENT DOCUMENTS

EP     0890622     1/1999

* cited by examiner

*Primary Examiner* — Robert S Walters, Jr.
(74) *Attorney, Agent, or Firm* — William Lambert

(57) ABSTRACT

Polyurethane coating compositions comprising a mixture of aromatic and aliphatic isocyanate, and a mixture of polyol resin are disclosed. Methods for treating an aged substrate are also disclosed.

18 Claims, No Drawings

US 8,541,059 B2

POLYURETHANE COATINGS WITH IMPROVED INTERLAYER ADHESION

FIELD OF THE INVENTION

The present invention relates to a polyurethane coating composition comprising an aromatic and aliphatic isocyanate mixture and an acrylic and polyester polyol resin mixture, and methods of using the same.

BACKGROUND OF THE INVENTION

Aviation and aerospace vehicles are often first coated with a primer based on epoxy resin or polyurethane and a curing agent, and overcoated with a curable two-component polyurethane topcoat that has resistance to water and organic solvents such as aviation fuel and/or hydraulic fluids. Primer is often applied to metallic surfaces for enhanced corrosion resistance or to polymeric surfaces to enhance the adhesion of subsequently applied layers, while topcoats are often chosen to achieve properties such as solvent resistance, weatherability, abrasion resistance, hardness, and/or aesthetics.

During use, the topcoat surface can age. The term "aged surface" as used herein refers to a surface whose physical and/or chemical properties are degraded compared to those of the new surface. Aging of surfaces can result from the effects of, for example, mechanical abrasion, impact, water, solvents, temperature, radiation, moisture, weathering and/or other mechanisms that cause degradation of the physical and/or chemical properties and/or the aesthetic qualities of a surface. "Aged surface" as used herein also includes surfaces that are degraded from their initially applied condition, wherein the degradation results from a relatively brief exposure to a stress, as compared to aging, which typically results from long term exposure to one or more stress conditions. For example, a surface can become damaged by mechanical stress such as abrasion, impact, and the like, thermal stress, such as exposure to excessive temperatures, exposure to solvents and/or chemical stress such as exposure to irradiation, and the like. In practice, it can be useful to refinish an aged surface to restore the physical, chemical, and/or aesthetic qualities of the surface.

Adhesion between the new coating or the "refinish" or "refinished" coating and the aged surface can contribute to the overall performance of the coating. When a part is first coated, the quality of the coating can exhibit the same or similar physical and chemical properties across the surface. However, for example, on used, aged, and/or damaged surfaces, and particularly for large surfaces such as an aircraft, a surface to be coated and/or refinished may not be homogeneous.

When a large surface such as that of an aircraft is to be refinished, the topcoat can be removed using a stripper before repainting. To avoid having to pre-treat a fresh metallic surface and reapply a new primer coating, it can be useful to only remove the topcoat layer before repainting. Swellable, strippable topcoats and processes for removing a topcoat while leaving a cured primer coating on a metallic surface are disclosed in U.S. Pat. No. 6,217,945, incorporated herein by reference. The stripping process can use solvents and generate chemicals waste, however, which may be undesirable.

In certain applications, it can be useful to apply a polyurethane topcoat to an aged polyurethane surface without first removing the aged coating. However, adhesion of polyurethane coatings to aged coatings may be poor. Surface phenomena of the aged coating, such as chalking, the presence of surface micropores, and/or entrapped water can contribute to the poor adhesion of new polyurethane topcoats to an aged coating.

To facilitate and/or enhance the adhesion of a new polyurethane topcoat to an aged polyurethane surface, the aged surface can be mechanically abraded prior to applying the new polyurethane topcoat. Mechanical abrasion of an aged surface can be accomplished by, for example, sanding. Sanding large surfaces, such as those of an aircraft, can be costly, time consuming, and/or difficult to control to the extent necessary to facilitate uniform adhesion of a newly applied topcoat. Furthermore, the process of mechanical abrasion can release particulates comprising potentially harmful and/or toxic chemicals.

Alternative methods to solvent stripping or mechanical sanding are therefore desired, particularly for aviation and aerospace applications.

SUMMARY OF THE INVENTION

The present invention is directed to a polyurethane coating composition comprising an isocyanate curing agent comprising an aromatic isocyanate and an aliphatic isocyanate ("isocyanate component") and a polyol resin comprising an acrylic polyol and a polyester polyol ("polyol component").

The present invention is further directed to a method for treating an aged surface comprising applying the polyurethane coating composition described above to the surface, drying the composition, applying a second coating composition to the polyurethane coating, and curing the second coating.

DETAILED DESCRIPTION OF THE INVENTION

The present invention is generally directed to a two-component polyurethane coating composition comprising an aromatic and aliphatic isocyanate mixture curing agent and an acrylic and polyester polyol mixture. It has been discovered that the present coating composition can provide improved interlayer adhesion without mechanical sanding or solvent stripping of the underlying aged coating layer prior to refinishing with new coating layer, particularly a polyurethane topcoat layer. In this manner, the present coatings function as a "tie coat".

A tie-coat is generally applied to an aged surface, such as an aged coating or topcoat layer, prior to applying a new coating. Thus, as used herein, "tie coat" refers to an intermediate coating intended to facilitate or enhance adhesion between an underlying surface, such as an aged coating, and an overlying coating, such as a topcoat. Use of a tie coat can avoid the need for mechanical sanding and/or solvent stripping.

In the present compositions, the isocyanate component, which functions as the curing agent, comprises a mixture of aromatic and aliphatic isocyanates. In certain embodiments, the isocyanate component comprises 1 to 50, such as 1 to 30, weight percent of aromatic isocyanate with weight percent based on total weight of the isocyanates used in the isocyanate component. It is believed that the reaction between the aromatic isocyanate with urea or urethane groups on an aged polyurethane topcoat contribute to a strong and durable interface adhesion, although the inventors do not wish to be bound by this. In certain embodiments, the isocyanate component can further comprise 70 to 99 weight percent of aliphatic isocyanate, with weight percent based on total weight of the isocyanates used in the isocyanate component. Aliphatic isocyanate can contribute to overall coatings properties such as application time, viscosity, weathering resistance, UV resistance and/or flexibility, although the inventors do not wish to be bound by this. Any aromatic and aliphatic isocyanates can be used. Particularly suitable aromatic and aliphatic isocyanates include those having two or more isocyanate groups. For example, suitable aromatic isocyanates include but are not limited to toluene 2,4-diiocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PDI), m-phenylene diisocyanate (PDI), naphthalene 1,5-diisocynate (NDI), naphthalene 2,4-diisocyanate (NDI), 1,5-naphthalene diisocyanate, p-xylylene diisocyanate (XDI), and the like; suitable aliphatic isocyanates include but are not limited to isophorone diisocyanate (IPDI), 1,4-cyclohexane diisocyanate (CHDI), 4,4'-dicyclohexylmethane diisocyanate (HMDI), bis(isocyanatomethyl)cyclohexane (HXDI), tetramethylxylylene diisocyanate (TMXDI), 1,6-hexamethylene diisocyanate (HDI) and the like. These isocyanates can be in any form, including but not limited to dimer, trimer, isocyanurate, adducts, polymeric and prepolymer isocyanate, and are commercially available from Bayer Corporation, BASF, ICI, Dow, Huntsman, Degussa and the like.

The polyol component of the present invention coating composition comprises a mixture of polyol resin comprising an acrylic polyol and a polyester polyol. In certain embodiments, the acrylic polyol comprises a hard acrylic polyol and a soft acrylic polyol. "Hard acrylic polyol" and like terms means an acrylic polyol with a glass transition temperature ("$T_g$") above 20° C.; "soft acrylic polyol" and like terms means an acrylic polyol with a $T_g$ below 20° C. In certain embodiments, the polyol component comprises (a) 40 to 80 weight percent of hard acrylic polyol, (b) 10 to 40 weight percent of soft acrylic polyol, and (c) 5 to 30 weight percent of a polyester polyol, with weight percent based on total solid weight of the polyol used in the polyol component.

The hard acrylic polyol may contribute toughness and/or strength to the coating when cured with the isocyanate curing agent. The hard polyol can be obtained by copolymerizing one or more hydroxyl-containing monomers such as hydroxyethyl (meth)acrylate, hydroxypropyl (meth)acrylate, hydroxybutyl (meth)acrylate, and the like, with other monomers typically employed in the synthesis of acrylic coating resins such as (meth)acrylic esters of $C_{1-4}$ monohydric alcohols, (meth)acrylic esters of cycloaliphatic monoalcohols, (meth)acrylic esters of aromatic monoalcohols, vinylaromatics, nitrile monomers, silane functional monomers, glycidyl functional monomers, fluorine-containing compounds and the like. Suitable hard acrylic polyol includes MACRYNAL SM510N, 515, 565/70BAC, VSM2872/70BAC that are commercially available from Cytec Corporation, JONCRYAL 550, 551, 552, 558, 580, 581, 587, 910 that are commercially available from BASF, and XCG-7204 that is commercially available from PPG Industries. When used, the hard acrylic polyol can be present at 40 to 80 weight percent, such as 50 to 70 weight percent, based on total solids weight of the polyol used in the polyol component.

In certain embodiments, the polyol resin mixture can further comprise a soft acrylic polyol, which may contribute flexibility to the coating when cured with the isocyanate curing agent. A soft acrylic polyol can be obtained by copolymerizing hydroxyl-containing monomers with other monomers typically employed in the synthesis of acrylic coating resins as discussed above with (meth)acrylate esters of $C_{4-18}$ monohydric alcohols. Suitable soft acrylic polyols include MACRYNAL SM513, SM540/60BAC, SM600/60XBAC that are commercially from Cytec Corporation and JONCRYAL 500, 507, 508, 920, 922, 942 that are commercially from BASF. When used, the soft acrylic polyol resin can be present at 10 to 40 weight percent, such as 20 to 30 weight percent, based on total solids weight of the polyol used in the polyol component.

The polyol component further comprises a polyester polyol. The polyester polyol may contribute to adhesion of the coating to other coating layers. Suitable adhesion promoter polyester resins include ADHESION RESIN LTW that is commercially available from Degussa Corporation, DESMOPHEN 1652 and 1700 that are commercially available from Bayer and the like. The polyester polyol can be present at 5 to 30 weight percent, such as 10 to 20 weight percent, based on total solids weight of the polyol used in the polyol component.

In addition to the aromatic and aliphatic isocyanate curing agent mixture, and the acrylic and polyester polyol resin mixture, the tie-coat polyurethane coating composition can further comprise solvents, catalysts, pigments, additives, and the like, which are formulated into either or both of the two components.

The selection of organic solvents can contribute to adhesion improvement and final coating performance. In general, the solvent or solvents may be chosen to wet the surface of the aged coating, lower the surface tension of the coating, dissolve the binder resin of the coating, facilitate the interpenetration of functional groups between coating layers, control the film formation, provide an environment for the curing reaction, and/or adjust the application time and/or pot-life. In addition, the solvent or solvents may be chosen to be miscible and/or compatible with the other components of the coating, such as the polyol resins, isocyanates, pigment(s), catalyst(s) and additive(s). Any organic solvent or solvents can be used, particularly those that will not interfere with the performance of the topcoat layer. Suitable organic solvents include but are not limited to aliphatic hydrocarbons such as hexane, heptane, octane, and the like; aromatic hydrocarbons such as benzene, toluene, xylene, and the like; ketones such as methyl isobutyl ketone, diisobutyl ketone, methyl ethyl ketone, methyl hexyl ketone, ethyl butyl ketone, and the like; and esters such as ethyl acetate, isobutyl acetate, amyl acetate, 2-ethylhexyl acetate, and the like. When used, the solvent(s) can be present at 20 to 60 weight percent, such as 30 to 50 weight percent, based on total weight of the coating composition.

In certain embodiments, the present coating compositions can further comprise a tertiary amine catalyst, metal compound catalyst or a combination of catalysts to get the desired curing rate. Both the tertiary amine and metal catalyst can significantly increase the reactivity of an aromatic isocyanate at ambient temperature. A metal compound catalyst is particularly suitable for increasing the reactivity of an aliphatic isocyanate at ambient temperature. In addition to the reaction rate, coating performance such as interlayer adhesion, application time, pot-life, and/or dry-to-tape, can be affected by the type and amount of catalyst(s). Suitable tertiary amine catalysts include but are not limited to triethylamine, N-methylmorpholine, triethylenediamine, pyridine, picoline and the like. Suitable metal compound catalysts include but are not limited to compounds based on lead, zinc, cobalt, titanate, iron, copper and tin, such as lead 2-ethylhexoate, zinc 2-ethylhexoate, cobalt naphthenate, tetraisopropyl titanate, iron naphthenate, copper naphthenate, dibutyltin diacetate, dibutyltin dioctate, dibutyltin dilaurate and the like. These catalysts can be used alone or in combination. When used, the total amount of catalysts can be 0.001 to 0.5 weight percent, such as 0.005 to 0.25 weight percent, based on total solids resin weight of the coating composition.

Suitable pigments and fillers can also be used in the polyurethane coatings formulation include carbon black, titanium dioxide, magnesium silicate, calcium carbonate, ferric oxide, aluminum silicate, barium sulfate, color pigments and the like. When used, the pigments and/or fillers can be present at 20 to 60 weight percent, such as 30 to 50 weight percent, based on total solids weight of the coatings composition.

As noted above, the present compositions are two component, or "2K" compositions. The two components of the polyurethane coating are maintained separate until immediately prior to application. After application, the isocyanate component and polyol component react to form a cured coating at room temperature. Aromatic isocyanates in the present coating compositions may react with urea and/or urethane groups on the surface of an aged polyurethane topcoat to produce a strong and durable chemical bond with the aged surface. When a second coating, such as a polyurethane topcoat that containing polyols and/or isocyanates, is applied to the coatings of the present invention, the functional groups of that second coating can react with the functional groups of the tie-coat, to form chemical bonding and polymer chain entanglement between the coating layers. The result is a multi-layer coating composite with good adhesion. In certain embodiments, the polyurethane coating compositions described herein can be applied to an aged surface such as an aged polyurethane topcoat without first mechanically abrading or solvent stripping the aged surface. Prior to application of the coating, the surface to be refinished can be treated to remove particulates and surface films. After the treatment, the coating compositions as disclosed herein can be applied to any appropriate dry film thickness. In certain embodiments, the dry film thickness of the coating can range from 0.2 mils to 2 mils, such as from 0.2 mils to 1 mil.

In certain embodiments, a polyurethane composition according to the present invention can be used as a tie-coat to provide enhanced adhesion between an underlying surface and a subsequently applied coating. The surface can be an aged surface, and can have a pre-existing coating, such as a pre-existing polyurethane coating. Accordingly, the present invention is further directed to a method of treating an aged surface by applying the present coating composition to at least a portion of the aged surface, applying a new coating, sometimes referred to herein as a second coating, to at least a portion of the aged surface coated with the coating of the present invention, and curing the coating. The appropriate curing conditions will be known to one skilled in the art based on the coating used. The tie coat of the present invention can be dried prior to application of the subsequently applied coating(s). Any number of tie coat and/or coating layers can be applied. In certain embodiments the aged surface will comprise an aged polyurethane surface, in certain embodiments the second coating will comprise a polyurethane coating, and in certain embodiments both the aged surface and the second coating will comprise polyurethane.

The polyurethane coating compositions of the present invention can be applied to a surface by brushing, spraying, dipping, rolling, flowing, and the like. Once the present composition is applied to a surface, film formation can be achieved with or without drying or heating. The time required for the coating to cure can depend at least in part on the solvent applied, the thickness of the coating, the vapor pressure of the solvent, the temperature and humidity, and/or the airflow at the surface. In certain embodiments, the cure time of the tie coat can range from 20 minute to 24 hours.

A second coat can be applied to the present coating using any appropriate coating method known in the art. More than one topcoat can be applied to any appropriate dry film thickness. For example, in certain embodiments the dry film thickness of a topcoat can range from 1 mil to 6 mils, such as from 2 mils to 4 mils. The topcoat can be cured according to recommended procedures known to those skilled in the art.

Following application of the polyurethane coating composition to the aged surface, both the tie-coat and second coating (or any additional coatings) can have excellent adhesion characteristics after full cure at ambient temperature for at least one week, or 24 hours at 60° C.

Adhesion can be determined by any appropriate methods, for example, Dry/Wet Tape Adhesion Test according to BSS 7225, or the Whirling Arm Test described below.

EXAMPLES

The following examples are illustrative of the present invention and are not intended to be limiting examples.

Whirling Arm Test

The adhesion of interlayer(s) and topcoat(s) was evaluated using the Whirling Arm Test, Method 1. Clad aluminum 2024-T3 air foils with the dimension 3 inches×6 inches×0.063 inches were treated with a chromate conversion coating according to MIL-C-5541, Class 1A. A primer was applied and allowed to dry 2 hours in the spray booth with dry film thickness of 0.5 to 1.0 mils. A first topcoat was applied and dried at specified curing conditions, such as 90° F./34% relative humidity (RH) or 75° F./17% RH for 72 hours with a dry film thickness of 2.0 to 4.0 mils. The air foils were removed from the oven and the leading edge nose at the tangent point between the radius and flat surfaces masked off. The tie-coat was applied with a dry film thickness of 0.2 to 1.0 mils and allowed to dry 20 minutes to 2 hours. A new polyurethane topcoat was applied with a dry film thickness of 2.0 to 4.0 mils and allowed to dry at least one week at ambient temperature or 24 hours at 60° C. before any adhesion test.

After all the coatings were applied and dried, mask tape that was applied on the leading edge nose was removed and the test air foils were immersed in water at 25° C. for 16 to 24 hours just prior to test. Within one hour after removal from the water, the test air foils were secured to a whirling arm fixture. The specimens were then exposed to 385 mile per hour (at specimen midpoint) with 3 to 4 inches per hour water spray (1 to 4 mm drop size) for 30 minutes. Failure was indicated when any coating peeled more than 0.25 inches from the leading edge of the test panel.

A polyurethane coating composition according to the present invention was prepared using a hard acrylic polyol resin, a soft acrylic polyol resin and a polyester polyol adhesion promoter resin, pigments, additives and solvents as the base component and using a blend of aromatic and aliphatic isocyanates as curing agent, as indicated below. The polyurethane coating composition was applied to an aged coating substrate and dried by ambient cure for 1 to 24 hours. A new polyurethane topcoat was applied to the dried coating composition of the present invention. The refinished surface passes the Whirling Arm test.

The composition for the base component and activator component are listed below.

TABLE 1

Base Component Formula

| Raw Material | Weight (Kg) | Description and manufacturer |
|---|---|---|
| XCG-7204 Resin | 28.00 | Acrylic resin solution from PPG Industries |
| MACRYNAL SM 600/60XBAC | 8.00 | Acrylic resin solution from Cytec Surface Specialties |
| Synthetic Resin LTW | 4.00 | Acrylic resin solution from Degussa Corporation |
| Xylene | 10.00 | Solvent from Aldrich |
| Butyl Acetate | 12.00 | Solvent from Aldrich |
| DABCO T-12 | 0.10 | Catalyst from Air Products Inc. |
| NICRON 604 | 23.00 | Pigment from Luzena America Inc. |
| TI PURE R-900 | 14.00 | Pigment from DuPont |
| Bentone 38 | 0.90 | Additive from Elementies Specialties, Inc. |
| Total | 100.00 | |

TABLE 2

Activator Component Formula

| Raw Material | Weight (Kg) | Description and manufacturer |
|---|---|---|
| DESMODUR N3390BA/SN | 21.00 | Aliphatic polyisocyanate from Bayer Material Science LLC |
| RUBINATE M | 5.00 | Aromatic polymeric MDI from Huntsman Polyurethane |
| Xylene | 31.00 | Solvent from Aldrich |
| Butyl Acetate | 43.00 | Solvent from Aldrich |
| Total | 100.00 | |

The base component and activator component of the present invention polyurethane coating were mixed at a 1:1 ratio by volume or 58%:42% ratio by weight and sprayed on an aged polyurethane topcoat with a dry film thickness of 0.2 to 1.0 mil; then a new polyurethane topcoat was sprayed on the top of the present invention coating.

The Whirling Arm Test was run as described above. The tie-coat of the present invention prepared as described above was applied with a dry film thickness of 0.2 to 1.0 mils. A high solid polyurethane aerospace topcoat was then applied and allowed to dry at least one week at ambient temperature or 24 hours at 60° C. for a dry film thickness of 2.0 to 4.0 mils before any adhesion test.

TABLE 3

Results of the Whirling Arm Adhesion Test

| | Test 1 | Test 2 | Test 3 |
|---|---|---|---|
| Aged topcoat material | Polyurethane topcoat | Polyurethane topcoat | Polyurethane topcoat |
| Surface Treatment | Mechanical sanding only | No treatment | Invention coating only |
| New topcoat material | Polyurethane topcoat | Polyurethane topcoat | Polyurethane topcoat |
| Whirling Arm Test | Pass | Failed | Pass |

The Whirling Arm Test results illustrate that excellent adhesion was achieved when the aged polyurethane topcoat was treated with a sanding process, and when the aged polyurethane topcoat was treated with the present tie-coat coating composition, whereas the adhesion test failed when the aged topcoat was not treated with either sanding or the present tie-coat. The results were confirmed and proved with several different types of commercial aerospace polyurethane topcoats. Therefore, the present invention provides a polyurethane coating composition that can provide consistent and reliable interlayer adhesion for a new topcoat onto an aged surface without mechanical sanding or solvent stripping.

What is claimed is:

1. A polyurethane coating composition comprising:
   a) an isocyanate component comprising:
      70 wt % to 99 wt % of an aliphatic isocyanate, wherein the aliphatic isocyanate comprises polymeric hexamethylene diisocyanate; and
      1 wt % to 30 wt % of an aromatic isocyanate, wherein the aromatic isocyanate comprises polymeric methylene diphenyl diisocyanate;
      wherein wt % is based on the total solids weight of the isocyanate component; and
   b) a polyol component comprising:
      40 wt % to 80 wt % of a hard acrylic polyol;
      10 wt % to 40 wt % of a soft acrylic polyol; and
      5 wt % to 30 wt % of a polyester polyol;
      wherein wt % is based on the total solids weight of the polyol component; and
      wherein the coating composition cures at room temperature.

2. The coating composition of claim 1, wherein the composition further comprises an amine and/or metal compound catalyst.

3. The coating composition of claim 2, wherein the catalyst comprises 0.005 to 0.25 weight percent of the total solids weight of the coating composition.

4. The coating composition of claim 1, wherein the composition further comprises one or more solvents.

5. The coating composition of claim 4, wherein the one or more solvents comprise 20 to 60 weight percent of the total weight of the coating composition.

6. A method for treating an aged polyurethane surface comprising:
   applying the polyurethane coating composition of claim 1 to at least a portion of the aged polyurethane surface;
   drying the polyurethane coating composition;
   applying a second coating layer to at least a portion of the dried polyurethane coating composition; and
   curing the second coating layer.

7. The method of claim 6, wherein the aged polyurethane surface is not mechanically sanded or solvent stripped prior to application of the polyurethane coating composition.

8. The method of claim 6, wherein the dry film thickness of the dried polyurethane coating is 0.05 mils to 1 mil.

9. The method of claim 6, wherein the resulting treated aged polyurethane surface passes the Whirling Arm test according to BMS 10-11 specification.

10. The method of claim 6, wherein the second coating layer comprises a polyurethane coating.

11. The method of claim 6, wherein the aged polyurethane surface comprises an aged polyurethane coating.

12. A substrate comprising:
   an aged polyurethane surface; and
   a dried polyurethane coating prepared from the polyurethane coating composition of claim 1 applied to at least a portion of the aged polyurethane surface.

13. The substrate of claim 12, comprising a second polyurethane coating applied to at least a portion of the polyurethane coating.

14. The substrate of claim 12, wherein the aged polyurethane surface is not mechanically sanded or solvent stripped prior to application of the polyurethane coating composition.

15. The substrate of claim 12, wherein the dry film thickness of the dried polyurethane coating is 0.05 mils to 1 mil.

16. The substrate of claim 12, wherein the dry film thickness of the dried polyurethane coating is 0.2 mils to 1 mil.

17. The substrate of claim 12, wherein the aged polyurethane surface comprises an aged polyurethane coating.

18. The substrate of claim 12, further comprising a second coating layer wherein the second coating layer comprises a polyurethane coating.

* * * * *